Patented May 27, 1941

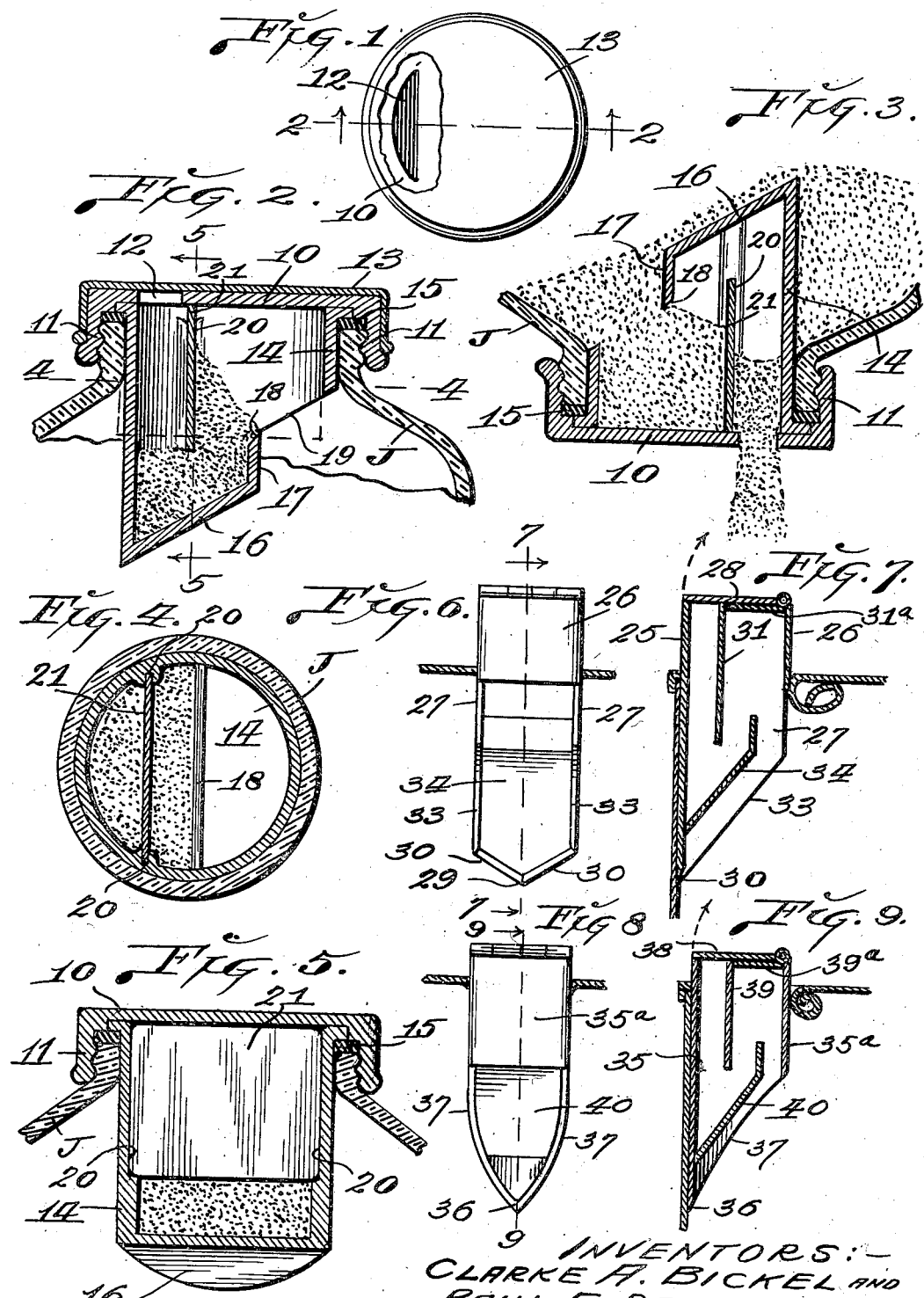

2,243,452

UNITED STATES PATENT OFFICE 2,243,452

MEASURING AND DISPENSING DEVICE

Clarke A. Bickel and Paul F. Danielson,
Los Angeles, Calif.

Application October 16, 1939, Serial No. 299,688

2 Claims. (Cl. 221—98)

Our invention relates to a measuring and dispensing device particularly designed for use on jars or containers and has for its principal object, the provision of a relatively simple, practical and inexpensive device that may be conveniently employed for accurately measuring and dispensing uniform amounts of dry or semi-dry fluid products, such as ground or pulverized coffee, sugar, salt, soap powder or in fact any other pulverized or granular product which flows freely when the container is shifted from one position to another.

Further objects of our invention are, to provide a measuring and dispensing device of the character referred to that may be readily applied to or removed from a jar or container, further, to provide simple and efficient means in the form of a packing ring and a cover which when properly applied to the device renders the same practically air and dust tight and consequently affording protection for the contents of the jar or container and further, to construct that portion of the device that projects into the upper portion of the jar or container so that when the latter is inverted the granular product will readily flow into the measuring compartment within the device.

Further objects of our invention are, to provide simple and easily adjusted means for regulating the volume of the amounts of products that successively enter and pass through the measuring device, thus making it possible for pre-determined amounts of the product, for instance, a teaspoonful or a tablespoonful of the product to be dispensed as the jar to which the device is applied is inverted and further, to construct that portion of the device in which the amounts of product are measured so that the granular material or substances will readily flow therethrough without tendency of clogging.

A further object of our invention is, to provide a measuring and dispensing device that may be readily applied to the conventional cans or containers of tin or sheet metal that are largely utilized in the packaging of coffee and like granular or pulverized products.

With the foregoing and other objects in view, our invention consists in certain novel features of construction and arrangement of parts that will be hereinafter more fully described and claimed and illustrated in the accompanying drawing in which:

Fig. 1 is a top plan view of the measuring and dispensing device with a portion of the removable cover therefor broken away.

Fig. 2 is an enlarged cross section taken on the line 2—2 of Fig. 1.

Fig. 3 is a sectional view similar to Fig. 2 and showing the container to which the measuring device is applied, inverted so as to discharge a measured quantity of the contents from the jar to which the device is applied.

Fig. 4 is a horizontal section taken on the line 4—4 of Fig. 2.

Fig. 5 is a vertical section taken on the line 5—5 of Fig. 2.

Fig. 6 is an elevational view of a form of the device that is adapted to be inserted in the top of a conventional can or container formed of tin, sheet metal, cardboard or the like.

Fig. 7 is a vertical section taken on the line 7—7 of Fig. 6.

Fig. 8 is an elevational view of a further modified form of the measuring device adapted to be inserted in a sheet metal can or container.

Fig. 9 is a vertical section taken on the line 9—9 of Fig. 8.

Referring by numerals to the accompanying drawing which illustrates a preferred embodiment of our invention, 10 designates the disc-like body portion of a cap or cover having an integral depending marginal flange 11 that is internally threaded in order that it may engage the external thread that is formed on the neck portion of a jar of like container J which may be formed of glass and which type of container is largely used in packaging ground or pulverized coffee and like products.

Formed in the body portion 10 of the cap to one side of the center thereof is an opening 12 through which the measured quantities of product discharge when the jar or receptacle is inverted.

In order to protect the contents of the jar or container from air, dust and the like, while said jar is not in use, a cover 13 fits snugly over the top of the body portion 10 of the cap and downwardly upon the external face of flange 11. This covering member 13 is applied to the cap 10 when the jar or container is packed and is removed only when the contents of the jar are periodically discharged.

Secured to the under side of the body portion 10 of the cap by a water proof adhesive or otherwise is the flanged upper end of a tube 14 that extends downwardly through the neck of the jar or container J and the upper portion of this tubular member is concentric and parallel with the flange 11.

In order to provide an air tight joint between the lip of the jar or container and the cap 10, a packing ring or gasket 15 of flexible or elastic material is positioned within the flange 11 of the cap immediately beneath the flanged upper end of tube 14 so that when the cap is applied to the jar said packing ring or gasket will rest directly on the lip that surrounds the mouth of the jar.

That portion of the tube 14 below the opening 12 extends downwardly into the upper portion of the chamber within the jar or container and closing the lower end of this downwardly extending portion is an inclined bottom wall 16 having a smooth under face. The inner edge of this inclined bottom wall extends diametrically across the lower portion of tube 14 at a point below the center of said tube, also the center of the cap 10, and projecting upwardly from this edge of the bottom wall 16 is a short vertically disposed wall 17, the upper edge 18 being inclined so as to correspond with the inclination of the bottom wall 16.

From this inclined or beveled upper edge of wall 17 the lower edge of the tube 14 on the opposite side from the portion that is closed by the bottom wall 16, extends upwardly on an inclined plane 19 that corresponds with the inclination of bottom wall 16 and the beveled edge 18.

The cover 10, its flange 11, together with the tube 14, bottom wall 16 and transverse wall 17, may be formed of any suitable material, preferably plastics or composition, and the cover 13 may be formed of a suitable plastic, composition, or thin sheet metal.

Formed in the inner face of the tubular wall 14 from a point a short distance above the inclined bottom 16 to a point near the top of said tube are oppositely arranged vertical grooves 20 and removably positioned in said grooves is a thin partition plate 21, preferably of metal.

The height of this partition plate is such that when properly positioned in the grooves 20, its lower edge occupies practically the same horizontal plane with the beveled upper edge 18 of wall 17 and the upper edge of said plate 21 is positioned directly against the under side of the body 10 of the cap.

The space between the lower edge of plate 21 and the inclined bottom 16 provides a throat which to a considerable extent determines the amount of pulverized product that enters that portion of the chamber within the tube 14 above the inclined bottom 16 when the jar is manipulated in dispensing the contents thereof.

By utilizing interchangeable plates 21 in the device and by varying the height of said plates between the edges that occupy the grooves 20, the height of the throat between the lower edge of the plate and the inclined bottom wall 16 may be varied so as to regulate the volume of the amounts of the product that are periodically dispensed from the jar or container.

In the use of the dispenser, the jar or container is inverted and the pulverized or granular product will, due to the circular shape of tube 14, flow around that portion of said tube that projects into the body of the jar or container and the flow of said product or material will be accelerated toward the opening into the tube beyond the transverse wall 17 due to the inclination of the exposed surface of the inclined bottom 16.

Thus the pulverized or granular product will completely fill the chamber in that portion of the tube 14 below the inclined edge 19 and below the beveled edge 18 of wall 17.

When the container is thus inverted, the partition 21 prevents the pulverized or granular material from discharging out through opening 12.

The container is now turned back to its normal upright position and in so doing a portion of the material in the chamber within tube 14 below the inclined edge 19 thereof will flow downwardly between the lower portion of partition 21 and wall 17 and such material will flow beneath the partition 21, thereby filling the chamber above the inclined bottom 16, the wall 17 and that portion of the wall of tube 14 that is connected to the inclined bottom.

The volume of the product thus trapped in the lowermost portion of the tube 14 above the inclined bottom 16 is pre-determined, due to position of the lower edge of plate 21 and its relation to the inclined bottom 16 and the beveled edge 18 of wall 17 so that with each subsequent turning of the container upside down a pre-determined amount of the product will be dispensed from the container through opening 12 in the cap.

The modified construction illustrated in Figs. 6 and 7 and which is adapted to be forced through the top of a sheet metal container, consists of a square tube comprising a long front wall 25, a short rear wall 26 and a pair of side walls 27. A door or cover plate 28 is hinged to the upper end of the short rear wall 26 and is adapted to swing into position to close the upper end of the tube by gravity.

The lower end of the front wall 25 is pointed as designated by 29 and the edges between the point and the side walls 27 are beveled to form cutting edges 30 which cut through the top of the can or container to which the device is applied.

Secured within the upper portion of the chamber within the tube adjacent and parallel with wall 25 is a vertically disposed partition 31 and arranged within the lower portion of the tube below this partition 31 is an inclined partition 34, the lower end of which is positioned against the lower inner face of rear wall 25 and the upper portion terminating at a point above the lower end of partition 31 and the lower end of the short rear wall 26.

Positioned between the upper edges of the rear wall 26 and partition 31 is a plate 31a which serves as a closure for the upper end of the loading chamber that is formed by said rear wall 26 and partition 31.

The lower edges of the side walls 27 are inclined as designated by 33 and the partition 34 is substantially parallel with said inclined lower edges 33.

When this form of device is positioned in the top of a can or container and the latter is inverted, a portion of the pulverized or granular contents of the can will flow downwardly into the loading chamber between the partitions 34 and 31 and when the container is subsequently turned back to its normal upright position, a portion of the granular or pulverized material will flow from said loading chamber into the pocket between the partition 34, the lower portion of partition 31 and between front wall 25 and lower portion of partition 31.

When the container is subsequently inverted, the pre-determined volume of material trapped in the pocket adjacent the lower portion of partition 31 will flow downwardly through the tube and discharge from the lower end thereof and which lower end is open due to the opening of the door or closure 28 by gravity.

The modified construction illustrated in Figs. 8 and 9 is adapted to be applied to a can of sheet metal, cardboard or the like by being forced through the top thereof and this construction includes a front wall 35 which is substantially half round in cross section and the lower portion of said wall being pointed as designated by 36, with the side edges of the wall above said pointed lower end sharpened to form cutting edges 37. Extending from the upper ends of the cutting edges 37 upwardly to the horizontal plane occupied by the upper edge of the curved wall 35 is a rear wall 35a. This construction enables the device to be readily forced through the sheet metal top of a can or like container.

The upper end of this form of device is closed by a gravity actuated door or plate 38 that is hinged to the upper edge of wall 35a. Arranged in the upper front portion of the tube formed by the walls 35 and 35a is a vertically disposed partition 39 and an inclined partition 40 is disposed in the lower portion of the tube just above the sharp edges 37, with the upper portion of said partition extending a short distance upwardly between the lower end of partition 39 and the lower portion of rear wall 35a.

Secured to the upper edges of rear wall 35a and partition 39 is a plate 39a that closes the loading chamber that is provided by said rear wall 35a and partition 39.

This device operates to discharge pre-determined amounts of the contents of the container to which said device is applied as the container is alternately inverted and turned right side up.

Thus it will be seen that we have provided a measuring and dispensing device that is relatively simple in construction, inexpensive of manufacture and very effective in performing the functions for which it is intended.

It will be understood that minor changes in the size, form and construction of the various parts of our improved measuring and dispensing device, may be made and substituted for those herein shown and described, without departing from the spirit of our invention, the scope of which is set forth in the appended claims.

We claim as our invention:

1. In a measuring and dispensing device, a cap adapted to be removably positioned upon the mouth of a container, said cap being provided with a discharge opening, a tube depending from said cap, an inclined bottom plate closing a portion of the lower end of said tube, the other portion of the lower end of said tube being inclined and occupying a plane above and parallel with said inclined plate, a vertically disposed wall formed integral with and projecting upwardly from the upper edge of said inclined plate, said wall extending diametrically across the intermediate portion of said tube and terminating at the lower end of the inclined opening into said tube and a partition removably positioned within said tube between the discharge opening in said cap and the upper edge of said diametrically disposed wall.

2. A measuring and dispensing device as set forth in claim 1 and the upper edge of said diametrically disposed wall being inclined.

CLARKE A. BICKEL.
PAUL F. DANIELSON.